Dec. 16, 1930.  J. J. HAZARD  1,785,627
RADIO
Filed Aug. 9, 1929   2 Sheets-Sheet 1

WITNESSES
Edw. Thorpe
A. J. Sperry

INVENTOR
Joseph J. Hazard
BY Munn&Co.
ATTORNEY

Dec. 16, 1930.  J. J. HAZARD  1,785,627
RADIO
Filed Aug. 9, 1929  2 Sheets-Sheet 2
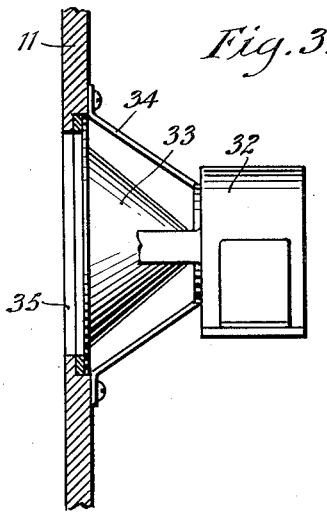
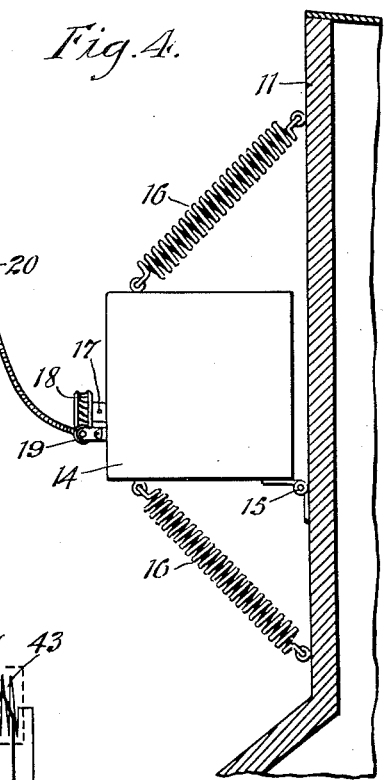
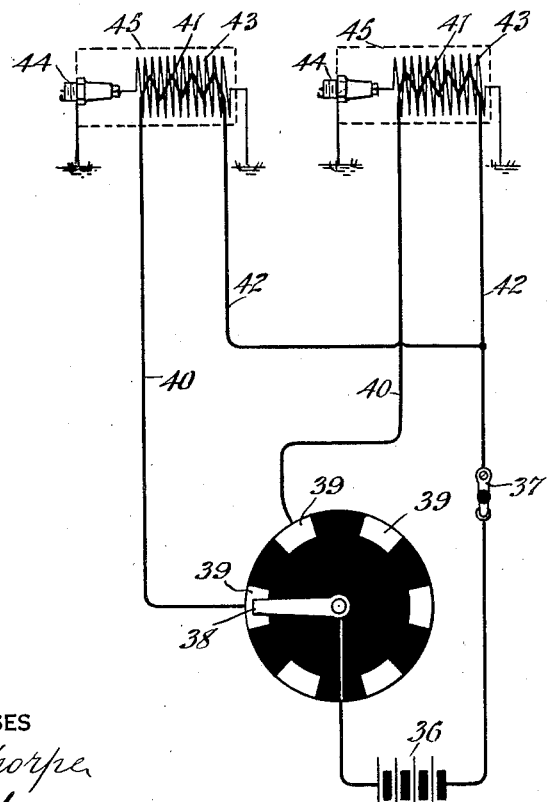
WITNESSES
INVENTOR
Joseph J. Hazard
BY
ATTORNEY Patented Dec. 16, 1930

1,785,627

UNITED STATES PATENT OFFICE

JOSEPH J. HAZARD, OF SARATOGA SPRINGS, NEW YORK

RADIO

Application filed August 9, 1929. Serial No. 384,728.

This invention relates to radios.

It is among the prime objects of the present invention to provide a novel and improved combination of a radio with a motor vehicle.

It is a further object of the present invention to provide in combination with a motor vehicle, a radio receiving apparatus carried thereby and control means for the receiving apparatus mounted adjacent the steering wheel of the motor vehicle.

A further object of the present invention is to provide in combination with a motor vehicle, a radio receiving apparatus and a dynamic speaker operated by the radio receiving apparatus.

A further object of the present invention is to provide in a motor vehicle, a dynamic speaker which utilizes the motor board as a baffle board for the speaker.

A further object of the present invention is to provide an improved mounting for a radio receiving apparatus in a motor vehicle, which mounting provides for resilient suspension of the apparatus whereby it will not be injured by shocks received by the vehicle.

A further object of the present invention is to provide improved remote control constructions for radio receiving apparatus, one of which includes an improved combined circuit controller and rheostat which operates from a single controlling knob.

A still further object of the present invention is to provide in a motor vehicle, a radio receiving apparatus and an improved ignition system which is shielded to prevent interference of the radio receiving apparatus by the ignition system.

Further objects of the present invention include the combination and interrelation of parts whereby the whole forms a novel, simple and improved combination, which has little interference, improved tone quality and which may be controlled without requiring the operator to remove his hands from the steering wheel.

Other objects of the present invention will be apparent from a consideration of the following specification taken in conjunction with the accompanying drawings, in which Figure 1 is a perspective view of the interior of a motor vehicle showing the mounting of the radio receiving apparatus, the loud speaker and the controls for the apparatus;

Fig. 3 is a detail view showing the mounting of the loud speaker;

Fig. 4 is a detail view illustrating the mounting of the radio receiving apparatus, and Fig. 5 is a fragmentary view illustrating the improved ignition system used in conjunction with associated features of the present invention.

Figure 1:
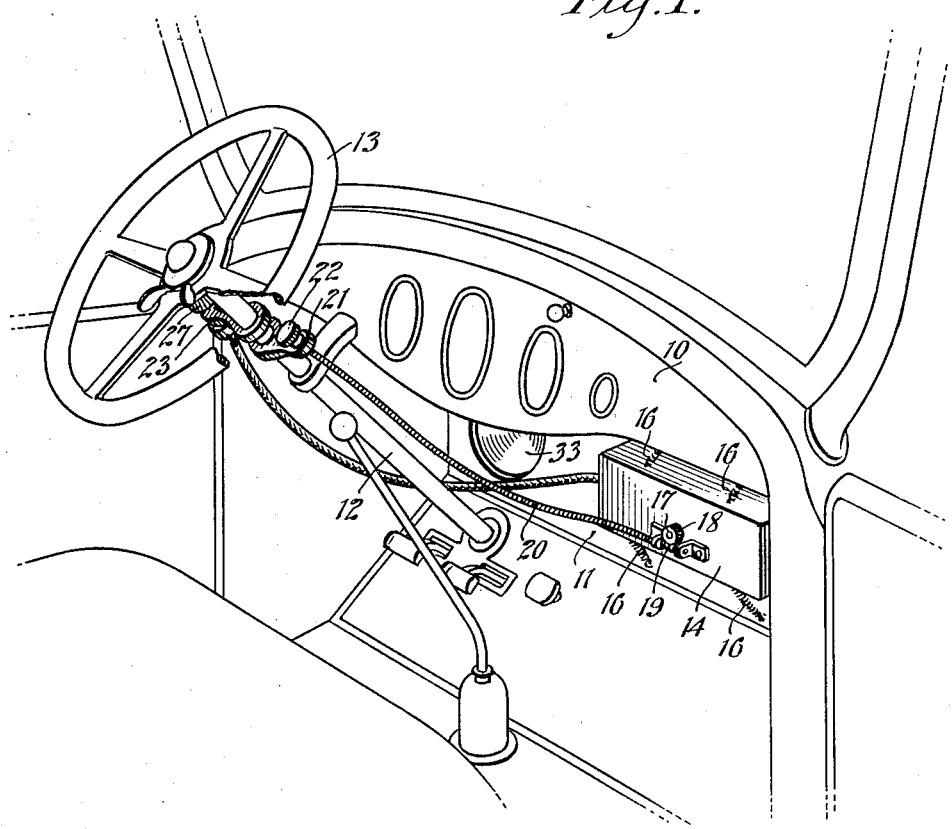

Referring more particularly to the drawings, a conventional form of motor vehicle is illustrated in Fig. 1, and includes a dashboard 10, motor board 11, steering column 12, steering wheel 13, and, as illustrated, the conventional controls, body, windshield and seat. It will be understood that the present invention is not confined to any specific type of motor vehicle, but that the invention may be applied to widely varying types of vehicles and that, if desired, suitable rearrangement of the structure herein set forth may accommodate the invention to conform with characteristics of other forms of vehicles. It will further be understood that the invention is not confined to automobiles but is readily suited for adaptation to other lighter or heavier-than-air aircraft.

Referring more particularly to Figs. 1 and 4 of the drawings, a radio receiving apparatus mounted within a suitable cabinet, is indicated by the numeral 14 and is mounted upon the tonneau side of the motor board 11. For providing improved mounting for the cabinet so that the apparatus therein will not be affected by the usual jars or vibrations of the vehicle body and motor board 11, the cabinet is secured to the motor board by a spaced pivotal connector herein illustrated as a hinge 15, which is secured to the lower face of the cabinet and to the tonneau side of the motor board, whereby upon vibration of the motor board a restricted pivotal movement of the cabinet with respect to the motor board may be had, which movement will take up vibration and will prevent damage to the radio receiving apparatus. For controlling the pivotal movement of the cabinet 14, a pair of upper and lower suspending springs 16 is provided, which extend from the motor board or associated parts of the vehicle to the top and bottom respectively of the cabinet 14. Any desired one of these springs may be readily detached to permit pivotal movement of the cabinet for inspection or repairs. Thus the mounting herein shown provides a resilient pivotal suspension for the cabinet. It will be understood that, if desired, a suitable buffer or buffers may be carried by the motor board to prevent sudden contact of the motor board with the back of the cabinet 14.

The radio receiving apparatus includes a conventional control shaft 17 which extends forwardly through the face of the cabinet and which is adapted to control condensers or other controllable apparatus of the receiving set. For operating the control shaft 17 without requiring the operator to remove his hands from the steering wheel 13 of the vehicle or shifting his normal driving position, the outer end of the shaft 17 is provided with a suitable motion transmitting assembly herein illustrated as a worm gear assembly including a gear 18 carried by the shaft 17, and a worm 19 which is in mesh therewith and which is rotatable by the rotation of a flexible cable 20 which as illustrated in Fig. 1, extends up the steering column 12 and is carried at its upper end by a supporting bracket 21 above which the cable terminates in a controlling knob 22 mounted adjacent the steering wheel. It will be understood that the invention is not confined to the specific association of the wheel 13 and knob 22 herein shown but that the invention contemplates the positioning of the control knob 22 either on the wheel, adjacent thereto, or in conjunction with other motor vehicle control members, the arrangement being such that for moving the shaft 17 to tune the radio, the operator is not required to change his normal vehicle-operating position.

Figure 2:
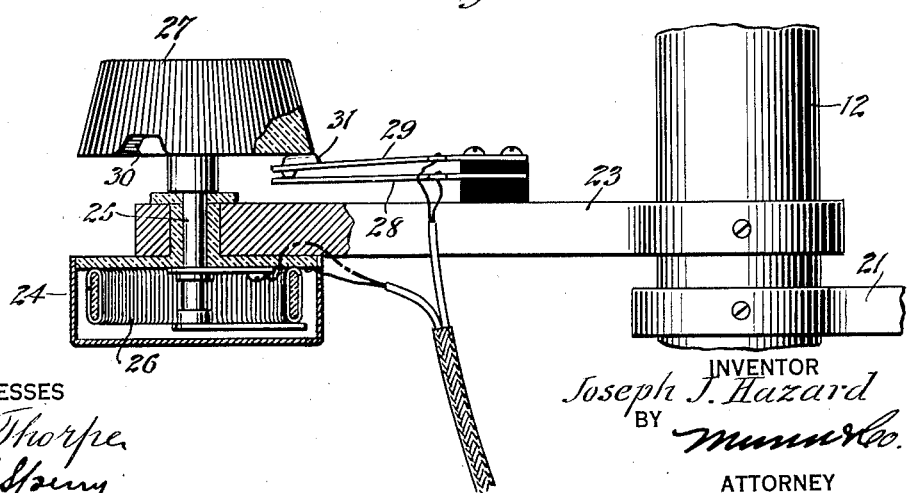
Fig. 2 is a detail view partly in section showing the improved circuit controller used in conjunction with the associated features of the present invention.

For controlling the electrical current for the radio receiver, there is provided an improved circuit controller as illustrated in Fig. 2, which controller is preferably mounted upon the steering column 12 by a suitable bracket 23. As illustrated in Fig. 1, the brackets 21 and 23 are preferably arranged to extend oppositely from the steering column so that they may be operated by each hand of the driver without requiring his hand to be removed from the steering wheel. Referring more particularly to Fig. 2, the circuit controller includes a suitably housed rheostat 24 or equivalent controller which by an operation of the shaft 25, will control the amount or voltage of electrical energy which passes through the coil 26 thereof. The housing of the rheostat 24 extends through the bracket 23 which provides a support therefor as illustrated, while the shaft 25 extends with the casing through the bracket 23 and terminates in a controlling knob 27.

For providing means for making or breaking the circuit to the rheostat 24 or an associated circuit, there is mounted on the bracket 23, a spring contact maker-and-breaker of the type generally referred to as a telephone jack, which includes a lower spring contact finger 28 and an upper finger 29 which is movable toward and away from the finger 28 to make or break the circuit therebetween. For operating the upper finger 29, the lower peripheral edge of the knob 27 is recessed as at 30, while the finger 29 is provided with an upwardly extending co-operating projection 31, the arrangement being such that when the radio is not used the knob 27 is rotated to permit the projection 31 to be received in recesses 30 thereof so that the finger 29 moves upwardly and breaks its contact with the finger 28 and thus the circuit to the radio receiving apparatus is broken. When, however, it is desired to operate the radio receiving apparatus, the knob 27 is turned, which cams the projection 31 outwardly from the recesses 30 and downwardly to engage the finger 28 and complete the circuit therebetween. It will be readily understood that the circuit which incorporates the fingers 28 and 29, may, if desired, be the circuit of the rheostat 24 or, if desired, may be a separate circuit, such, for instance as the "A" circuit, while the rheostat may be in the "B" circuit of the radio. It will be seen from this construction that after contact is made between the fingers 28 and 29, by a still further rotation of the knob 27, the knob is free to rotate almost a complete revolution, thus varying the setting of the rheostat without changing the contacted relation of the fingers 28 and 29.

For providing novel and improved tone qualities in a motor vehicle radio receiving apparatus, the present invention includes a dynamic speaker which because of the difficulty in mounting and the requirement of a baffle board has not heretofore been used in motor vehicle radios. Referring more particularly to Fig. 3, it will be seen that the present invention provides a dynamic speaker, including an operating unit 32, the conical diaphragm 33, and a supporting spider 34, which supports the unit and diaphragm. In the present invention the diaphragm is mounted within an aperture 35 of the motor board 11 and is supported with its unit 32 by the attachment of the outer legs of the spider 34 with the front or engine side of the motor board 11. The arrangement is such that the motor board acts not only to support the dynamic speaker but as a baffle board therefor. It has been found that this arrangement provides improved tone qualities and that directional propagation of sound waves therefrom is avoided, whereby the device will propagate sound waves forwardly through the hood of the motor and/or rearwardly into the tonneau thereof. This feature of the invention thus provides for the use of a dynamic speaker in a motor vehicle and it utilizes the motor board of the vehicle as a support for the speaker and as a baffle board therefor.

For preventing distortion of messages received by the receiving apparatus due to the interference by the ignition system of the motor vehicle, the invention includes provision for shielding the ignition system so that a high powered receiving apparatus may be used and so that a delicate receiving apparatus may be used. This feature of the invention is important in view of the desirability to use in a radio receiving apparatus, a screen grid tube which is powerful and delicate and which will normally be affected by a motor vehicle ignition system which is in close vicinity thereto.

Referring more particularly to Fig. 5, a schematic diagram showing a portion of the ignition system is illustrated and includes the normal source of potential, such as a battery 36, one side of which leads through a controlling switch 37 to the negative side of a series of high tension transformers. The other side of the battery leads to the conventional commutator which includes a rotating brush 38 which passes over a series of contacts 39, each of which is connected through a suitable conductor 40 to the opposite side of the primary coil 41 of the transformers, the other side being connected by conductors 42 with the negative potential of the battery 36 through the switch 37. The secondary coils of the transformers, as indicated at 43, are grounded upon one side while the opposite side extends to the spark plugs 44 of the engine, one of the contact points of which is grounded in a conventional manner. The transformers are provided with suitable grounded shielding boxes indicated by the dotted lines 45, the arrangement being such that in place of the single high tension transformer which is usually positioned between the battery and the brush 38, individual high tension transformers are provided for each of the spark plugs 44 and are shielded by the box indicated at 45. The arrangement is such that the shield box covers the spark plug as well as the transformer so that no high tension conductors are unshielded. It will be understood that the transformer coils may be associated directly with the spark plugs. Thus a complete single shielding is provided for the plug and transformer assemblies. The diagram presented in Fig. 5 discloses in detail only two of the spark plugs and associated high tension coils. It will be understood, however, that as illustrated by the six points 39 of the commutator, the circuit may be arranged to provide for the ignition of any desired number of cylinders in the motor. It will be seen by this circuit that as the high tension current is that which adversely affects the radio reception, the shielding herein provided will prevent disturbances of radio reception by the ignition system of the vehicle.

Considering the present invention it will readily be seen that by the combination and interrelation of circuits and apparatus, the invention provides for the use in a motor vehicle, of a radio receiving assembly including a dynamic speaker and a screen grid receiving apparatus. It will be understood that the various features of the invention herein presented combine to provide new and unexpected results which were heretofore not permissible. The invention also provides apparatus in a definite co-related interdependent combination whereby an efficient modern radio receiving apparatus may be mounted, operated and controlled in a motor vehicle without change of the driver's position and with minimum interference by the ignition system of the vehicle and with the advantages of the improved quality of sound reproduction attainable only by the dynamic type of speaker.

From the foregoing it will readily be seen that the invention is not confined to the specific structural details herein presented but that numerous changes, modifications, and the full use of equivalents may be resorted to without departing from the spirit or scope of the invention as outlined in the appended claims.

What is claimed is:

1. In a device of the character described, the combination of a motor vehicle, having an apertured motor board, a radio receiving apparatus, and a dynamic speaker for said apparatus, said speaker being mounted on the motor board and positioned to speak through the aperture therein and utilizing the board as a baffle board.

2. In a device of the character described, the combination with a motor vehicle, a radio receiving apparatus, and remote controls for said apparatus mounted adjacent the controls of the motor, a bracket secured to the steering column adjacent the steering wheel formed with an opening for receiving and supporting the ends of said controls near said steering wheel.

3. In a device of the character described, a motor vehicle including a motor board, a radio receiving apparatus, a cabinet therefor swingably supported on said motor board and resilient means for limiting the swinging movement thereof.

4. In a device of the character described, a motor vehicle including a motor board, a radio receiving apparatus, a cabinet therefor supported by said motor board in movable relation thereto, said cabinet being supported by pivotal connection with the motor board, a spring connected to the top of said cabinet for limiting the swinging motion in one direction, and a second spring connected to the bottom of said cabinet limiting the swinging movement of the cabinet in the opposite direction.

5. In a device of the character described, a motor vehicle including a motor board, a radio receiving apparatus, and a cabinet therefor supported by said motor board in movable relation thereto, said cabinet being supported by pivotal connection with the motor board and including spring elements mounted between said cabinet and said motor board.

6. In a motor vehicle and in combination therewith, a shielding high tension ignition system, a radio receiving apparatus, and a dynamic reproducer for said receiving apparatus, said dynamic reproducer being supported by and extending through the motor board of the motor vehicle, and utilizing the same as a baffle board therefor.

7. In a motor vehicle and in combination therewith, a shielded high tension ignition system, a radio receiving apparatus, a dynamic reproducer for said receiving apparatus, said dynamic reproducer being supported by and extending through the motor board of the motor vehicle and utilizing the same as a baffle board therefor, and pivotal and resilient means for supporting the radio receiving apparatus on the motor board.

8. In a motor vehicle and in combination therewith, a shielded high tension ignition system, a radio receiving apparatus, a dynamic reproducer for said receiving apparatus, said dynamic reproducer being supported by and extending through the motor board of the motor vehicle and utilizing the same as a baffle board therefor, pivotal and resilient means for supporting the radio receiving apparatus on the motor board, distant controls for the receiving apparatus, means carried by the steering column of the vehicle for supporting the ends of said distant controls near the steering wheel of the vehicle.

9. In a device of the character described, the combination with a motor vehicle provided with a steering wheel and a steering column, of a radio apparatus, a circuit controller for said apparatus provided with a rheostat and an operating knob therefor, said knob being formed with a depression at one point, and a circuit maker-and-breaker including a pair of normally spaced resilient contact fingers, one of said fingers having a raised portion adapted to fit into said recess when said knob is in a given position, said knob acting to move one of the fingers into contact with the other finger when moved so that the recess is out of engagment with said raised portion.

JOSEPH J. HAZARD.